(12) United States Patent
Zhu et al.

(10) Patent No.: US 12,717,498 B2
(45) Date of Patent: Aug. 25, 2026

(54) DATA TIERING WITH ERASURE CODING USING TRAFFIC ESTIMATION AND FEEDBACK CONTROL

(71) Applicant: Microsoft Technology Licensing, LLC, Redmond, WA (US)

(72) Inventors: Jianfeng Zhu, Shanghai (CN); Yifan Li, Shanghai (CN); Lu Wang, Beijing (CN); Haoran Li, Shanghai (CN); Fangkai Yang, Beijing (CN); Guoqing Geng, Shanghai (CN); Terry Chen, Shanghai (CN); Pei Xiao, Beijing (CN); Zheng Dong, Shanghai (CN); Yu Kang, Shanghai (CN); Zhenshan Yu, Shanghai (CN); Yue Chen, Shanghai (CN); Qingwei Lin, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 55 days.

(21) Appl. No.: 18/827,649

(22) Filed: Sep. 6, 2024

(65) Prior Publication Data

US 2026/0072596 A1 Mar. 12, 2026

(51) Int. Cl.
*G06F 3/06* (2006.01)

(52) U.S. Cl.
CPC .......... *G06F 3/0619* (2013.01); *G06F 3/0644* (2013.01); *G06F 3/0649* (2013.01); *G06F 3/0658* (2013.01); *G06F 3/0685* (2013.01)

(58) Field of Classification Search
CPC .... G06F 3/0619; G06F 3/0644; G06F 3/0649; G06F 3/0658; G06F 3/0685
See application file for complete search history.

(56) References Cited

U.S. PATENT DOCUMENTS

| | | | | |
|---|---|---|---|---|
| 9,959,060 | B1 * | 5/2018 | Tang | G06F 3/0679 |
| 2014/0136571 | A1 | 5/2014 | Bonvin | |
| 2017/0228282 | A1 * | 8/2017 | Gupta | G06F 12/0895 |
| 2020/0233598 | A1 | 7/2020 | Bezugly | |
| 2020/0326871 | A1 | 10/2020 | Wu et al. | |
| 2021/0240372 | A1 | 8/2021 | Loh et al. | |
| 2022/0342578 | A1 * | 10/2022 | Chen | G06F 3/0653 |
| 2025/0028445 | A1 * | 1/2025 | Deshmukh | G06F 3/0658 |

FOREIGN PATENT DOCUMENTS

| | | |
|---|---|---|
| CN | 117762345 A | 3/2024 |

* cited by examiner

*Primary Examiner* — Hosain T Alam
*Assistant Examiner* — Alan Otto
(74) *Attorney, Agent, or Firm* — Barta Jones, PLLC

(57) ABSTRACT

A computerized method determines erasure coding (EC) formats for data extents in storage systems. Traffic history data of a data extent to be stored in the storage system is obtained. Estimated future traffic data is generated using a traffic estimation model, wherein the traffic history data is provided to the model as input. A current storage system constraint is calculated using the obtained traffic history data, and a constraint adjustment value is determined using a proportional, integral, derivative (PID) controller based on the current storage system constraint. An EC format for the data extent is determined using the estimated future traffic data and the determined constraint adjustment value and the data extent is stored in the storage system using the determined EC format. Use of the model and the PID controller balances optimized storage use with efficient data traffic handling.

20 Claims, 6 Drawing Sheets

DATA TIERING WITH ERASURE CODING USING TRAFFIC ESTIMATION AND FEEDBACK CONTROL

BACKGROUND

Managing the storage of large quantities of data has become an important and expensive endeavor for many corporations and other large entities. In some cases, different types or formats of erasure coding (EC) are used to optimize accessibility of some data (e.g., hot EC formats) while reducing the storage resources used to store other data (e.g., cold EC formats). Recent research has primarily focused on optimizing the conversion process between hot EC and cold EC, typically relying on static rules to decide when to switch between them. However, modern storage systems store wide varieties of data that change dynamically and rapidly over time. Designing static rules that can keep up with the rapid changes while also maintaining efficient data access and storage capabilities is extremely challenging in such an environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for determining erasure coding (EC) formats for data extents in storage systems is described, wherein a data extent is a contiguous block of storage space allocated for storing data. Traffic history data of a data extent to be stored in the storage system is obtained. Estimated future traffic data is generated using a traffic estimation model, wherein the traffic history data is provided to the model as input. A current storage system constraint is calculated using the obtained traffic history data, and a constraint adjustment value is determined using a proportional, integral, derivative (PID) controller based on the current storage system constraint. An EC format for the data extent is determined using the estimated future traffic data and the determined constraint adjustment value and the data extent is stored in the storage system using the determined EC format. The method dynamically determines EC formats for data extents based on rapidly occurring changes in the associated storage system.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
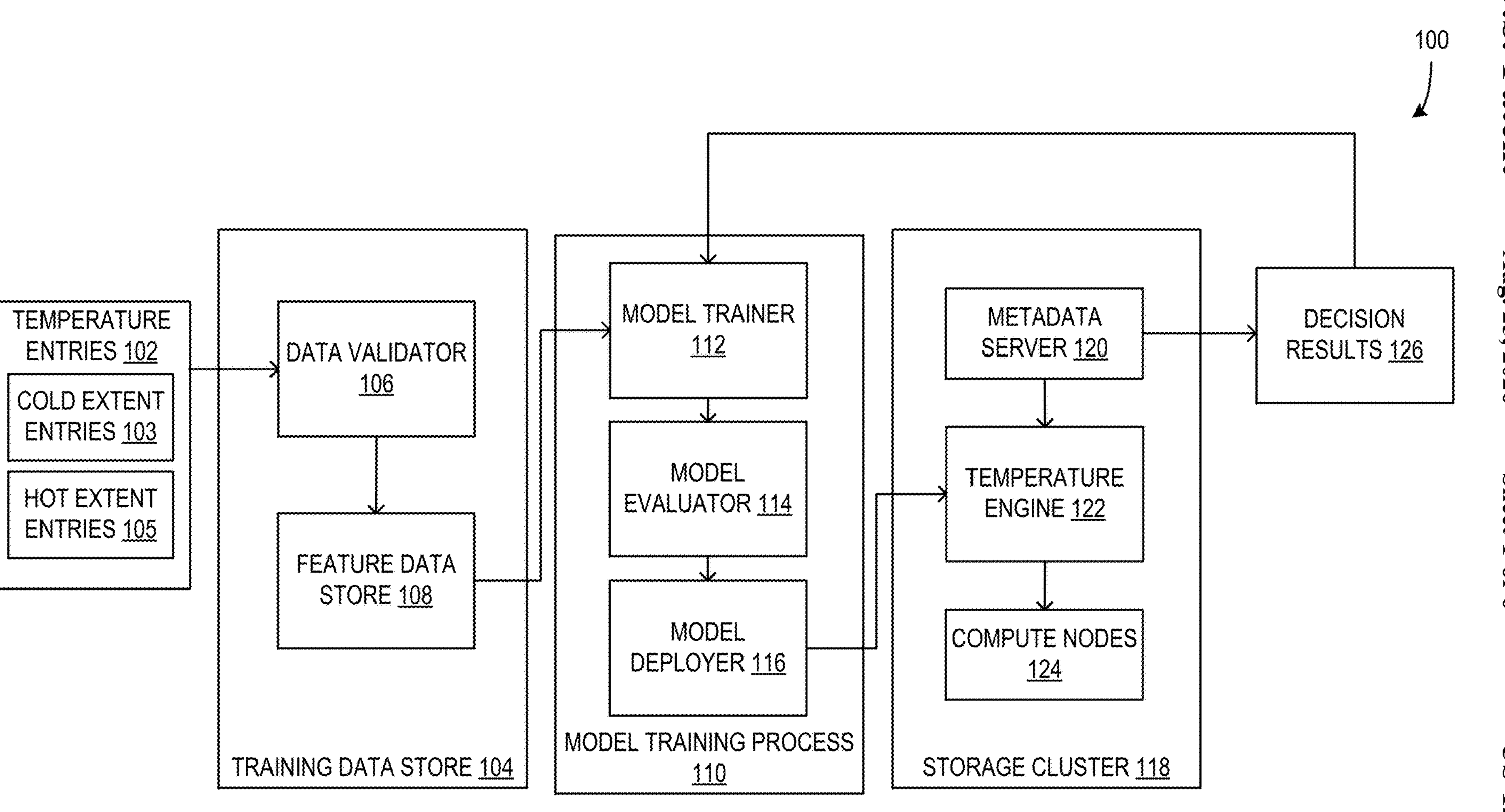
FIG. 1 is an illustration of an example system configured to train models to classify data extents to be stored using erasure coding (EC)

Aspects of the disclosure provide systems and methods for determining the erasure coding (EC) formats to use for data extents (e.g., data extents are contiguous blocks of storage space allocated for storing data) in a storage system to optimize the storage capacity used by the storage system while also enabling efficient access to data stored in high-traffic data extents. In some examples, the disclosure includes a traffic estimation model that is used to estimate how much future traffic will target a data extent, and a feedback controller that monitors defined constraints of the storage system and identifies adjustments to be made to the ways data extents are stored in order to maintain those defined constraints. For ease of description, various examples herein describe the feedback controller as a proportional, integral, derivative (PID) controller. However, aspects of the disclosure are not limited to a PID controller; other feedback controllers are contemplated such as using fuzzy logic, a model predictive controller, and a state-space controller.

The traffic estimation model and the PID controller are used in combination to determine whether a particular data extent should be stored using a cold EC format or a hot EC format. Thus, the EC format selection is based on both the future traffic estimation of the specific data extent as well as the current state of the storage system in general with respect to the defined constraints that are being maintained.

The data stored in cloud storage may exhibit diverse access patterns. Depending on these patterns, various strategies can be employed to determine the appropriate data format, each of which may incur differing storage costs. For instance, data infrequently accessed may be transitioned to a cold storage format. Aspects of the disclosure are directed to a solution for data tiering, leveraging EC and machine learning methodologies. This solution facilitates the attainment of an optimal equilibrium between the accuracy of data hotness tagging and the maximization of cost savings in storage.

Examples of the disclosure rely on historical traffic data for each extent. The historical data of extents is accessible in existing storage systems without incurring additional costs, as it forms a fundamental part of system operations monitoring. Furthermore, example methods of the disclosure are designed to be flexible; they handle each extent separately, which makes it easy to fit into existing storage setups. This independent decision-making aligns well with the modular design of current storage systems, ensuring our approach can be implemented with little to no disruption. By using data and infrastructure that are already in place, the described examples boost storage management efficiency without needing major system upgrades or new equipment, providing a practical and straightforward solution for improving how storage and data are managed.

Aspects of the disclosure operate in an unconventional manner at least by using a PID controller or other feedback controller in the management of storage systems. Applying PID controllers to storage management allows for continuous and automatic adjustment of parameters to meet target storage performance and constraint goals, adapting dynamically to changing workloads and determining conditions. By leveraging a PID controller, the described storage system can dynamically adjust the decision modules based on real-time constraint metrics, ensuring that constraints are maintained close to target values, while minimizing storage capacity usage as much as possible. Compared to static or manually adjusted systems, this significantly enhances the responsiveness and efficiency of storage operations.

Further, examples of the disclosure, unlike traditional feedback control systems, which are reactive and based solely on current and past errors, integrate predictive analytics using trained models to foresee future states. This forward-looking approach allows the system to proactively adjust before performance degrades, substantially improving system responsiveness and preventing bottlenecks. The combination of estimated future traffic data of a data extent generated by a trained model and constraint adjusted values determined by a PID controller to determine an EC format for the data extent enables an efficient, precise balance between cold EC formatted extents and hot EC formatting extents. This reduces the overall storage capacity required by optimizing the use of cold EC formatting while also optimizing the resources required to manage data traffic by strategically storing higher-demand data extents using the hot EC formatting.

Additionally, in some examples, aspects of the disclosure include incorporating local feature evaluation to enable the PID controller to make decisions based on extent features and variations within the storage system. This results in more finely tuned adjustments that are better suited to the goal of satisfying constraints and obtaining lower storage resource costs during operation of the associated storage system.

Further, aspects of the disclosure include the introduction of an 'extent filter' module which addresses a fundamental challenge of implementing PID in storage systems the potential for the global state to overpower the extent-specific data in the extent decision. This module allows the PID controller to focus on meaningful changes in storage conditions and to avoid unnecessary adjustments. This not only prevents the system from becoming unstable due to frequent tweaking but also enhances the overall efficiency and longevity of the storage solution. The described examples stand out not only for the novel application of PID controllers in storage management but also for the integration of advanced predictive and/or estimating capabilities and localized decision-making. By adding an extent filter module, the examples further refine the control strategy, making them uniquely suited to modern storage environments where data load and usage patterns are highly variable and unpredictable. This integrated approach ensures optimal performance and robustness, setting a new standard for dynamic storage management systems.

FIG. 1 is an illustration of a system 100 configured to train models to classify data extents to be stored using EC. The system includes temperature entries 102 that are used as training data in the training data store 104, a model training process 110 that uses the training data to train models at the model trainer 112, evaluate models at the model evaluator 114, and deploy models at the model deployer 116, and a storage cluster 118 that includes a temperature engine 122 which uses the deployed models to perform the EC classification of data extents as described herein.

Figure 6:
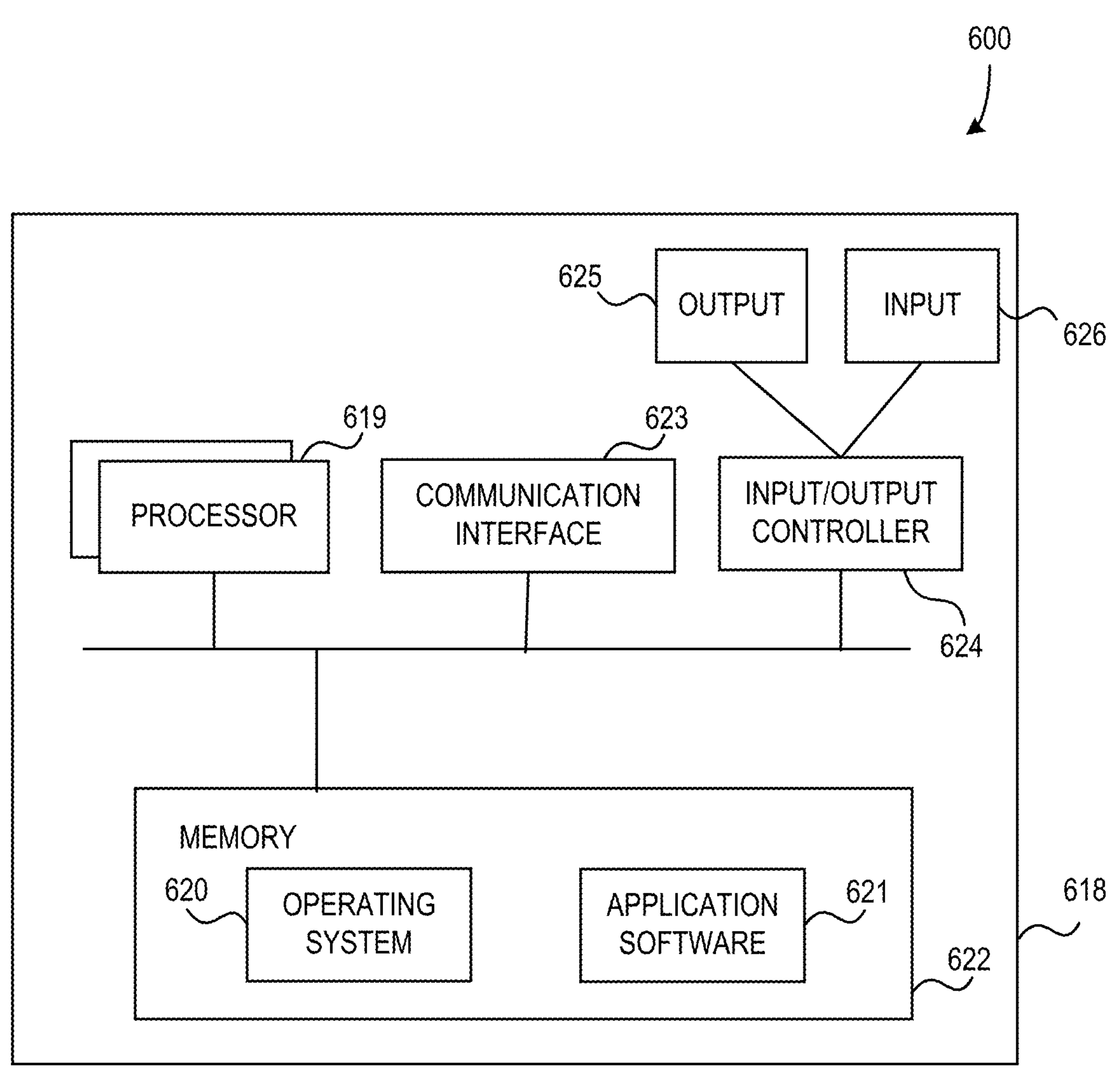
FIG. 6 illustrates an example computing apparatus as a functional block diagram.

Further, in some examples, the system 100 includes one or more computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the model training process 110 is executed on a first computing device and the storage cluster 118 is located on a second computing device within the system 100. The first computing device and second computing device are configured to communicate with each other via network connections. Alternatively, in some examples, other components of the storage cluster 118 (e.g., the metadata server 120, the temperature engine 122, and/or the compute node 124) are executed on separate computing devices and those separate computing devices are configured to communicate with each other via network connections during the operation of the storage cluster 118. In other examples, other organizations of computing devices are used to implement system 100 without departing from the description.

The system 100 has two primary objectives: to minimize total storage and to maintain a constraint ratio, as shown in the following formula 1 and formula 2:

$$\text{Minimize} \sum \text{Extent}_{size} \tag{1}$$

$$\frac{UserColdRead}{TotalUserRead} < 0.01 \tag{2}$$

The first objective is to minimize the cumulative size of all data extents ($\Sigma\text{Extent}_{size}$). This goal aims to reduce the overall storage footprint, enhancing the system's efficiency by reducing the amount of space required to store data. The second objective focuses on maintaining a specific constraint ratio, defined as the ratio of the sum of traffic from users that access cold extents divided by the sum of traffic from users that access an extents $$\left(\text{e.g., } \frac{UserColdRead}{TotalUserRead} \leq 0.01\right).$$

A ratio threshold is defined (e.g., 0.01) which ensures that the proportion of user reads directed towards cold extents remains very low, such that that most of the traffic is concentrated on hot extents. Here, UserColdRead is the sum of traffic from users to access cold extents, while TotalUserRead is the sum of all traffic from users.

Distributed storage systems commonly adopt EC since it offers high reliability at a low storage cost compared to data replication. However, different EC formats present tradeoffs between recovery performance and storage overhead. Particularly, they can be classified as either cold or hot EC, depending on their focus on optimizing recovery performance or storage overhead. Cold EC offers lower storage costs but heavy rebuild cost in terms of disk I/O and network bandwidth. On the other hand, hot EC provides higher recovery capability (e.g., including enhanced performance and durability) but requires more storage space. Hot EC is optimized for data that is frequently accessed and modified.

It is commonly used in systems where data is expected to change often, such as online storage systems, databases, or cloud storage services. It provides fast encoding and decoding of data. However, hot EC uses more redundant fragments to provide better fault tolerance and faster recovery in dynamic environments, thus requiring more data storage capacity. In contrast, cold EC is designed for the data that is infrequently accessed and remains mostly static. It focuses on minimizing redundancy and computational complexity to optimize storage space and reduce costs. While sacrificing some performance, cold EC ensures data integrity and resilience, making it suitable for archival storage, backup systems, and long-term data retention where access latency is less critical compared to storage efficiency and reliability.

In some examples, the $Extent_{size}$ element of formula 1 includes separate values for extents that are stored using hot EC formats and for extents that are stored using cold EC formats, wherein each of the different formats has a weight factor or ratio applied. By using such weight factors, minimizing the use of hot EC formats is emphasized as it has a greater effect on the result of the formula than the use of cold EC formats. Such weight factors can be tuned to fit the specific requirements of an implementation of system 100 without departing from the description.

Further, in some examples, the system 100 provides an adaptive and flexible policy for determining the appropriate EC format for each data extent. The trained models of system 100 enable the use of hot EC for frequently accessed data extents to ensure high performance, while using cold EC for less frequently accessed data extents. However, it is important to note that hot EC incurs higher storage costs. Leveraging machine learning and optimization techniques, the system 100 dynamically classifies each data extent with respect to an assigned EC format, aiming to minimize total data storage while maximizing reliability, keeping lower read traffic at cold EC extents.

The temperature entries 102, include cold extent entries 103 and hot extent entries 105, are used as training data in the training data store 104 and used by the model training process 110 as described herein. Temperature entries 102 include information about specific data extents that have been stored using hot EC formats and/or cold EC formats. The information includes the types of data stored in the extents, the quantities of data stored in the extents, as well as other data related to the extents, such as historical data that indicates the quantity of traffic that accesses the extents over time.

The data validator 106 is configured to perform data validation operations on the temperature entries 102 prior to adding feature information from the temperature entries 102 to the feature data store 108 for use as training data. In some examples, the data validation operations include operations that ensure that the data stored in the feature data store 108 is complete and has the correct formatting for use by the model training process 110. Further, in some such examples, the data validation includes operations such as bias analysis to control for biases that may be present in the temperature entries 102.

The feature data store 108 includes the validated data features of the temperature entries 102 stored in a format that is compatible with the model training process 110. For instance, in some examples, the data features of a specific extent are stored in association with an indicator as to whether the extent was stored in cold EC format or hot EC format. In this way, a classifier model can be trained to classify other extents with similar data features for storage using the cold or hot EC formats. The data features include data type, data quantity, historical traffic data associated with the data extent, or the like. In other examples, more, fewer, or different types of data features are stored in the feature data store 108 without departing from the description.

The model trainer 112 of the model training process 110 includes hardware, firmware, and/or software configured to train a classifier model and/or other models to determine whether a particular data extent should be stored using the cold EC format or the hot EC format. The features of the extent are analyzed by such a trained model to make the decision. Additionally, in some such examples, the current state of the overall data store also affects the decision made by the model. For instance, in an example, the ratio of hot extents to cold extents is found to be too high in the data store currently and the trained model is therefore more likely to determine that an extent should be stored using the cold EC format. The determination or decision process is described in greater detail below at least with respect to FIG. 2. The model trainer 112 uses machine learning techniques to train one or more models for use in this decision-making process.

The model evaluator 114 performs evaluation operations on trained models from the model trainer 112 and, if the model evaluator 114 determines that the trained models are sufficiently accurate and/or effective, the models are approved for deployment. Alternatively, if the evaluation by the model evaluator 114 results in the determination that the trained models are not sufficiently accurate and/or effective, the models are returned to the model trainer 112 for more training and/or deleted or otherwise removed from the system 100. The operations of the model evaluator 114 include testing the performance of the model on various data sets, including testing for accuracy and consistency of the model.

The model deployer 116 of the model training process 110 deploys the model to the temperature engine 122 of the storage cluster 118 when the model has been evaluated and approved by the model evaluator 114. Further, in some examples, the model deployer 116 is configured to deploy multiple models to the temperature engine 122 and/or to deploy copies or clones of the same model to multiple different temperature engines.

The temperature engine 122 of the storage cluster 118 is configured to perform the operations described herein using the trained models to determine whether data extents are stored using the cold EC format or the hot EC format based, at least in part, on the goals of minimizing total extent storage size and maintaining a relatively low cold extent ratio, as described above.

In some examples, the metadata server 120 is configured to query from the temperature engine 122 regarding if there are candidate extents that are either pending cold to hot or hot to cold EC format transition. The metadata server 120 then drives the pending candidate extents to be transitioned to the target EC formats via a transition state machine.

Further, in some examples, the compute nodes 124 are used to perform data processing tasks initiated by the temperature engine 122, such as performing rounds of aggregation tasks in a map-reduce flow.

In some examples, the decision results 126 from the storage cluster 118 are provided back to the model trainer 112 for use in training new versions of the models used by the temperature engine 122. In this way, the models are consistently being updated based on real-world data, thereby improving the accuracy and/or effectiveness of the models over time. In some such examples, the decision results 126 include information about data extents that have been stored and indications regarding the EC formats used to store them.

Figure 2:
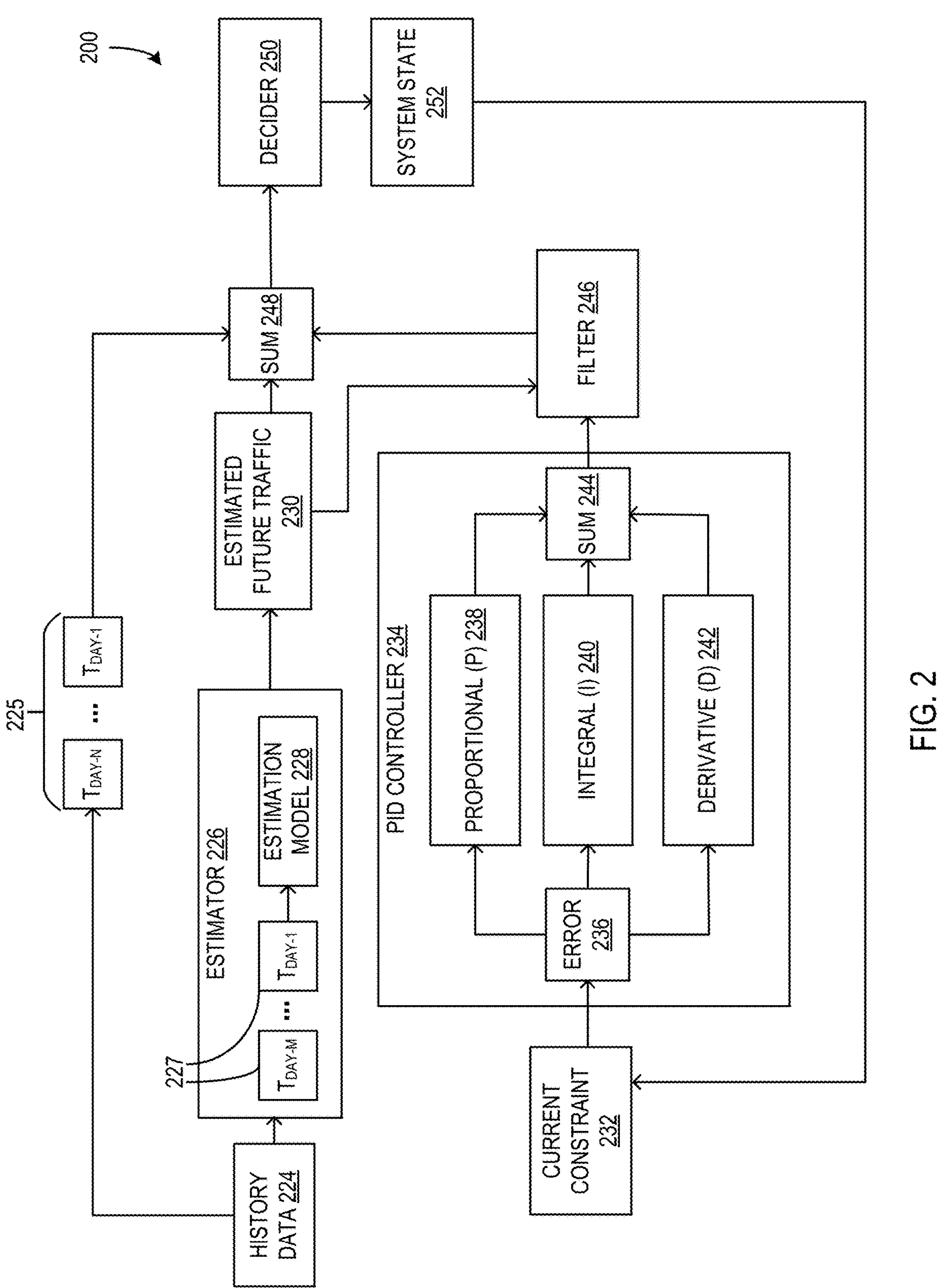
FIG. 2 is a block diagram illustrating an example system configured for automatically determining the EC format with which to store a data extent.

FIG. 2 is a block diagram illustrating a system 200 configured for automatically determining the EC format with which to store a data extent. In some examples, the system 200 is deployed to a temperature engine 122 in a system such as system 100 of FIG. 1. The system 200 is configured to use history data 224 and a current constraint 232 of a data storage system to determine whether to store a data extent using the cold EC format or the hot EC format. The system 200 uses an estimator 226 that combines historical traffic data 227 with a trained estimation model 228 to generate estimated future traffic data 230. Further, a PID controller 234 is used to maintain system constraints within defined ranges, wherein the constraints are associated with resources required by data extents stored using cold and hot EC formats, as described below.

In some examples, the estimation model 228 of the estimator 226 is a trained linear regression model. Linear regression is a statistical method that models the relationship between one or more independent variables and a dependent variable. The linear regression model is used as the estimation model 228 for its simplicity and effectiveness. This model is employed to predict two key metrics for each extent: the traffic and the ratio of traffic to the size of the data extent (traffic/size). The traffic/size ratio is directly used to make decisions about the status of each data extent (e.g., whether it should be marked as hot or cold for the purposes of EC formatting) thereby aiding in optimal data placement and retrieval strategies. Meanwhile, the prediction of traffic volumes supports the PID controller 234 by contributing to the current constraint 232 determination, providing it with necessary data to dynamically adjust system constraints to maintain performance levels.

Further, in some examples, the dataset used for training the linear regression model consists of history data 224, arranged in chronological order to preserve the sequence of events (e.g., the historical traffic data 227 from previous days arranged in chronological order in the estimator 226). The model is trained to minimize the difference between predicted values and actual values and evaluating its performance using metrics like mean squared error (MSE) and $R^2$. The estimation model 228 provides data-driven insights that enable proactive and efficient handling of storage resources.

Additionally, or alternatively, in some examples, to improve and/or enhance the effectiveness of the estimation model 228, it is updated regularly. There are two triggers to do so. First, the estimation model 228 is retrained periodically (e.g., every one or two months). This interval is based on empirical observations and may be adjusted later. Second, the update of the estimation model 228 is triggered by monitors. There is a monitor to capture the number of back-and-forth temperature transitions which can be used to indicate that the model fails to accurately reflect the true situation. Another monitor provides the cold read percentage of the associated storage system, which is used to trigger a model update when the quantity of cold reads increases after application of the model. The read factor (e.g., cold user reads/total user reads) has been considered during the training phase to make sure it will not be over a defined threshold (e.g., 1%).

Further, in some examples, it is not feasible to train an estimation model 228 for every storage cluster due to the storage and computer resource requirements. Tenant data is clustered based on traffic quantity (e.g., five levels of traffic data from cold to hot) and an estimation model 228 is trained for each level of traffic.

The PID algorithm used by the PID controller 234 is a control loop feedback mechanism. The PID algorithm calculates an 'output', which is the control signal for a system, to correct the error between a desired setpoint and a measured process variable. The formula for the output of the PID controller is given by equation 3 below:

$$\text{Output} = K_p \times e(t) + K_i \times \int e(t)dt + K_d \times \frac{de(t)}{dt} \quad (3)$$

In equation 3, $K_p$, $K_i$ and $K_d$ are the proportional 238, integral 240, and derivative 242 gains, respectively. e(t) represents the error 236 between the setpoint and the measured value at time t. The PID controller 234 adjusts the process by calculating the PID responses and combining them using a sum 244 to produce the control action. The proportional term $K_p$ Xe(t) addresses the current magnitude of the error, the integral term $K_i \times \int e(t)$ corrects past accumulated errors, and the derivative term $$K_d \times \frac{de(t)}{dt}$$

predicts future error trends, enabling the system to preemptively counteract disturbances before they affect the system.

Integrating a PID controller into the storage system overcomes at least the limitations of making decisions based solely on the characteristics of individual extents without considering the overall system state. Relying only on local extent features can lead to two primary issues: exceeding system constraints and underutilizing system capacity. Decisions based on local extent features may cause the system to operate beyond acceptable constraints, resulting in slower response times and degraded performance. Conversely, if the system's overall constraints are not fully utilized, opportunities for further compression and optimization of storage may be missed.

The PID controller 234 is used to address various issues by dynamically regulating the decision-making process based on comprehensive system state information (e.g., system state 252). The PID controller 234 maintains the system's constraints within acceptable limits while minimizing storage usage. For example, when the constraints in a storage system are relatively low, it means more extents can transition to a cold state, thereby reducing storage usage. At this point, the PID controller will adjust and lower the requirements for extents to become cold based on the current global constraint information. By doing so, the system 200 enhances both the user access efficiency (e.g., faster response time and increased system performance) and cost-effectiveness of the associated storage system. The integration of the PID controller transforms the storage system's decision-making process from a locally focused approach to a holistic, system-wide strategy. This transformation not only addresses the inherent limitations of extent-based decision-making but also enhances overall system performance and cost-efficiency, making the storage system more robust, responsive, and economical.

In some examples, the working process of the PID controller 234 is divided into three steps. First, the current constraint 232 is calculated. The current constraint 232 indicates the state of the system constraint at the time when the EC format decision is made for the current extent. The current constraint 232 is the ratio of the traffic accessing cold extents to the traffic accessing all extents, as illustrated by the following equation 4.

$$\text{constraint}_{cur} = \frac{\sum_0^i \text{Cold Predict Traffic}(\text{extent}_i)}{\sum_0^i \text{Predict Traffic}(\text{extent}_i)} \quad (4)$$

In equation 4, i represents the decision to proceed with the i–th extent. The current constraint 232 is $\text{constraint}_{cur}$, the traffic accessing cold extents is represented by $$\sum_0^i \text{Cold Predict Traffic}(\text{extent}_i),$$

and the traffic accessing all extents is represented by $$\sum_0^i \text{Predict Traffic}(\text{extent}_i).$$

Since the traffic value for the extent is unknown at the time of decision-making, it relies on the estimator 226 to forecast the traffic for each extent.

Second, the PID controller 234 takes as inputs the current constraint 232 and the desired target constraint (e.g., a constraint goal). It computes the ratio between these two values to generate a corrective output. This output is determined through the PID formula where is represented by equation 5:

$$\text{constraint\_pid} = \frac{PID(\text{constraint}_{cur}, \text{constraint}_{goal})}{\text{constraint}_{goal}} \quad (5)$$

In equation 5, constraint_pid represents a ratio of the output of the PID controller 234, represented by PID ($\text{constraint}_{cur}$, $\text{constraint}_{goal}$), to the constraint goal, represented by $\text{constraint}_{goal}$. The PID output (e.g., the sum 244) will adjust the extent state decision to align the current traffic condition with the desired constraint levels. If the PID output is positive (constraint_pid>0), it suggests that the current constraint 232 is below the target, implying there is room to relax conditions and mark more extents as cold without risking system performance. This transition helps to achieve lower storage. Conversely, if the PID output is negative or zero, it indicates that the current constraint exceeds the target, suggesting a need to tighten conditions by marking extents as hot. This action helps manage the constraint by potentially reducing cold traffic and adjusting the overall traffic distribution to more active use.

Third, the PID controller 234 outputs are combined with traffic thresholds to make final state decisions for data extents. The decision process is represented by equation 6 below, in an example.

$$\text{Output} = w1 * \text{constraint\_pid} + w2 * (\text{threshold} - \text{Traffic}) \quad (6)$$

$$\text{if output} > 0 \text{ state} = \text{cold}$$

$$\text{else state} = \text{hot}$$

Herein, w1 and w2 are weights assigned to the PID output and the traffic threshold difference, respectively. Specifically, the equation 6 calculates an output based on weighted contributions from the PID controller's output and the difference between a predefined traffic threshold and actual traffic. If the output is positive (e.g., output>0), the extent is marked as 'cold'. If the output is negative or zero, the extent is marked as 'hot', suggesting a need to prioritize data accessibility and response times over storage cost. The weights, w1 and w2, adjust the influence of each component on the final output.

This methodical use of a PID controller 234 integrates predictive traffic analysis with real-time system status to make informed decisions about the thermal state of extents. By doing so, it ensures that the system operates within optimal constraints, enhancing overall efficiency and stability. The ability to dynamically adjust to changing traffic patterns not only preserves system performance but also optimizes resource utilization, which is crucial in large-scale storage environments. This further improves the functioning of the underlying computing components.

It should be understood that, in other examples, other types of feedback controllers are used in place of the PID controller 234 without departing from the description. For instance, in some examples, controllers such as fuzzy logic controllers, adaptive controllers, sliding mode controllers, or other types of model-based controllers are used to maintain the constraints of the storage system as described herein.

The decider 250 evaluates the sum traffic of the past six days along with the estimated future traffic for the coming day. Based on the aggregate of these traffic values, it decides whether to mark an extent as 'cold' (e.g., to be formatted using the cold EC format), 'hot' (e.g., to be formatted using the hot EC format), or maintain its current state. This decision is contingent upon the age of the extent and specific traffic thresholds. Cold EC candidates are chosen based on expected remaining life and expected future read traffic, which is traffic used by user applications. The expected remaining life is estimated by extent age and the future read traffic is estimated by historical read traffic. The extent age is the number of days it exists. For traffic, using only traffic to assess the hotness or coldness of an extent is inappropriate because larger extents typically have a much higher absolute traffic compared to smaller ones. Therefore, the traffic ratio (T), defined as traffic divided by size as shown below in equation 7, is used to determine the state of an extent.

$$T(\text{traffic ratio}) = \frac{\text{Traffic}}{\text{Extent}_{size}} \quad (7)$$

First, the sum (e.g., sum 248) of the ratio (traffic/size) for the last N (e.g., 6) days, as illustrated at historical traffic data 225, and the estimated future traffic for the next day (estimated future traffic 230) are computed. This sum is associated with an extent denoted as $T_{total}$ in equation 8:

$$T_{total} = T_{day-6} + T_{day-5} + \ldots + T_{day-1} + T_{day0-predicted} \quad (8)$$

In some examples, based on the calculated $T_{total}$ and the age of the extent, the following rules are applied to update the thermal state of the extent. If the age of the extent (in days) is 7 or more (or another age threshold), and the total ratio $T_{total}$ over the last seven days (including the predicted day) is less than 0.01 (or another ratio threshold), then the extent is marked as 'cold'. If the $T_{total}$ over the last seven days is greater than 0.1 (or another ration threshold), then the extent is marked as 'hot'. If neither of the above conditions is met, the extent retains its current state. It should be understood that, in other examples, other age thresholds and/or ratio thresholds are used without departing from the description. Let A represent the age of the extent, and $T_{total}$ represent the calculated total ratio as defined. The decision function is represented as shown below in equation 9, in an example:

$$\text{state} = \begin{cases} \text{"cold"} & \text{if } A \geq 7 \text{ and } T_{total} < 0.01 \\ \text{"hot"} & \text{if } T_{total} > 0.1 \\ \text{"}\mathit{originalstate}\text{"} & \text{otherwise} \end{cases} \quad (9)$$

The status of an extent is determined by its historical and predicted data in the decider 250. The historical data provides a solid foundation for decision-making based on proven usage patterns, while incorporating predictive data stabilizes decision-making and adapts it to future trends, ensuring the system remains effective under evolving conditions.

In some examples, the output of the PID controller 234 is used with a filter 246 to influence the decisions of the decider 250 in the following manner. The primary factor influencing decisions about the state of extents is the characteristics of the extents themselves (e.g., the historical traffic data 225 and the estimated future traffic 230), followed by global constraint information from the PID controller 234. The filter 246 is configured to refine the application of PID controller 234 in the system 200, ensuring more effective and targeted decision-making. In some such examples, the filter 246 prevents ineffective state transitions that are dominated by global information from the PID controller 234 rather than individual extent characteristics from the historical traffic data 225 and the estimated future traffic 230. To address this, extents are categorized into three types: certainly cold, certainly hot, and uncertain extents. This classification enables the system 200 to apply PID controller 234 control judiciously, focusing primarily on uncertain extents where the cost of transitioning states is tolerable and the classification itself is not clear-cut.

To identify uncertain extents, a formalized criterion is used based on predictive traffic ratios. An extent is deemed uncertain and eligible for PID-based decision-making if the estimated future traffic is in the interval [pid_L,pid_R], where pid_L and pid_R are predefined thresholds that delineate the lower and upper bounds of the interval within which an extent's traffic ratio must fall to be considered uncertain. If an extent is classified as uncertain, then the output of the PID controller 234 is used during the decision-making process by the decider 250 as described above. Alternatively, if the extent is classified as certainly cold or certainly hot, the output of the PID controller 234 is not used in the decision-making process and the decider 250 relies on the historical traffic data 225 and the estimated future traffic 230 of the extent being analyzed.

When a decision is made by the decider 250, it should be understood that, in some examples, the decision results in the extent being stored in the associated data storage system using the EC format that corresponds to the decision made. For example, if the decision is that the extent is 'cold', the extent is then stored in the data storage system using the cold EC format and if the decision is that the extent is 'hot', the extent is then stored in the data storage system using the hot EC format). Further, the storage of the extent using one of the EC formats affects the system state 252, which includes information such as the current quantity of extents stored using the cold EC format and the current quantity of extents stored using the hot EC format, as well as traffic data associated with those extents. The system state 252, after being updated based on the storage of the extent, is then provided for use in calculating the current constraint 232 during the processing of the next extent for storage. Thus, the current constraint 232 used by the PID controller 234 is kept up to date.

Figure 3:
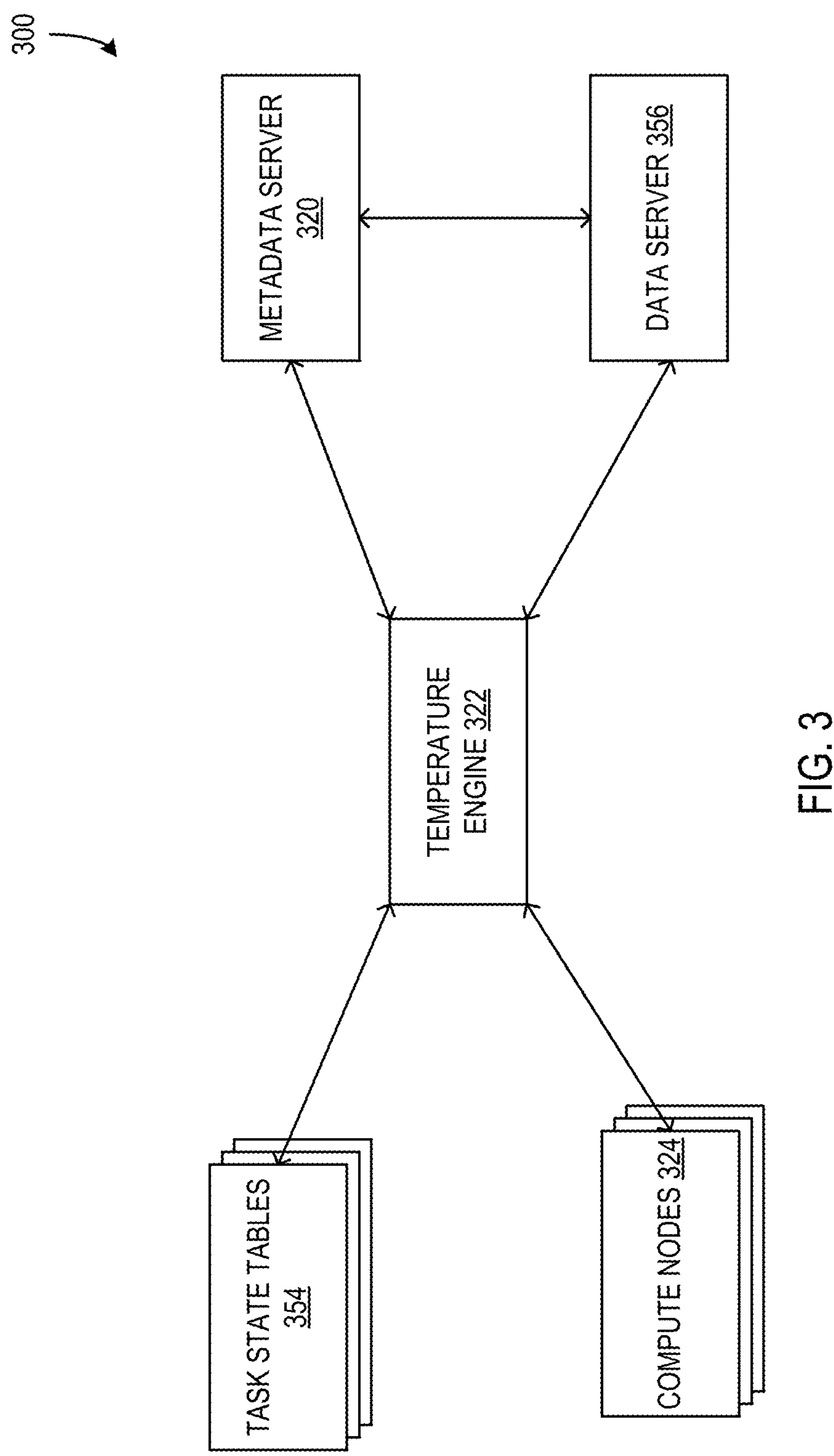
FIG. 3 is a block diagram illustrating an example system configured to enable the temperature engine to interact with other system components to facilitate the storage of data extents using EC formats as described herein.

FIG. 3 is a block diagram illustrating an example system 300 configured to enable the temperature engine 322 to interact with other system components (e.g., metadata server 320, the compute nodes 324, the task state tables 354, and the data server 356) to facilitate the storage of data extents using EC formats as described herein. In some examples, the system 300 is part of or associated with a system such as system 100 of FIG. 1.

The metadata server 320 is key for core stream service success, so the temperature engine 322 is configured to run the temperature engine 322 service in the background with respect to the metadata server 320. It should be understood that, in other examples, more and/or different background services are executed on the temperature engine 322 without departing from the description. Further, in some examples, multiple instances of the temperature engine 322 are executed to manage the processing load of the overall system.

In some examples, the temperature engine 322 is configured to operate as a service host and task scheduler. The temperature engine 322 is configured to decide when and how to schedule tasks for data processing; to store all task states and results for failover support; to determine how compute tasks should retrieve raw temperature data files on the data server 356; to build cold/hot extent lists; to expose application programming interfaces (APIs) to server queries with respect to fetching cold/hot extent lists on demand; and/or to perform garbage collection for intermediate result streams and/or out of date streams.

Further, the temperature engine 322 is configured to perform data processing tasks, such as processing raw extent temperature data files, periodically based on a schedule and/or based on the occurrence of events associated with the system 300. For instance, in an example, data processing is performed once per day or in response to the receipt of new raw temperature data to be processed.

In some examples, the final cold/hot extent list results and/or intermediate results of each data processing stage are persisted in data streams, enabling the temperature engine 322 to support failover without losing any data for the final extent list result, while also enabling intermediate streams to be publicly accessible by compute nodes 324 for data processing.

Additionally, or alternatively, in some examples, the temperature engine 322 is configured to process newly reported raw temperature data from the data server 356 periodically (e.g., every 4 hours for data from a current day). Separate stream directories are used to store the aggregated extent level temperature data for each round of processing. The aggregated data from all these sub directories represents the current day's extent level temperature data up to the latest round. In some such examples where tenants have large quantities of extents (e.g., 100 million extents), a plurality of streams (e.g., 1024) are used to partition and host the extent temperature data.

Task state tables 354 are configured to store data processing task/job states for use in failover support and task resume after failover. In some examples, the temperature engine 322 maintains the task states in memory during operations and updates the task state tables 354 with task state data at the end of each round of data processing. Further, in some examples, an entry in a task state table 354 includes a data server instance targeted by a task, a date associated with the task, a task state indicator, a start and/or finish time of the task, and/or a quantity of retries of the task. Alternatively, or additionally, in other examples, entries in the task state tables 354 include more, fewer, and/or different types of data without departing from the description.

In some examples, the temperature engine 322 uses a plurality of compute nodes 324 to perform data processing tasks or jobs associated with analyzing data associated with data extents in order to determine the temperature (e.g., the type of EC format to use with the data extent as described herein) of those data extents. Because the data extents are very large and/or there are large quantities of data extents to analyze, the data processing operations for the data extents are broken up into many smaller data processing tasks which are assigned to the compute nodes 324. In some such examples, more compute nodes 324 can be created as needed to manage the data processing tasks.

The metadata server 320 is configured to query the temperature engine 322 to obtain cold/hot extent lists and associated data and to drive EC transitions of data extents on the data server 356 based on decisions from a decision module (e.g., decider 250). Further, in some examples, the temperature engine 322 interacts with the metadata server 320 to drive the "freeze" and "unfreeze" data flow in the system 300. If it has been determined that a data extent should be stored using the cold EC format, but the data extent has not been formatted yet, it is added to an extent freeze queue such that the data extent will be formatted using the cold EC format when it rises to the top of the queue.

Alternatively, if it has been determined that a data extent should be stored using the hot EC format, but the data extent has been previously formatted using the cold EC format, the data extent is added to an extent unfreeze queue, such that the data extent will be formatted using the hot EC format when it rises to the top of the queue. It should be understood that, in some examples, the conversion between cold EC format and hot EC format includes some data processing operations that are performed by the metadata server 320 and/or by other entities of the system 300 without departing from the description.

The data server 356 is used by the temperature engine 322 to facilitate the management and processing of data associated with data extents. Temperature data is written as files each day. The data server 356 is used to manage those files. In some examples, the data server 356 writes temperature data of data extents to the temperature files and also obtains that temperature data from memory and writes the temperature data to partitioned data streams. Alternatively, in some examples, the data server 356 uploads the raw temperature data to data streams and compute node 324 jobs are scheduled to parse the raw temperature files and append the parsed data to the partitioned data streams. Further, in some examples, compute node 324 jobs are scheduled for the data server 356 to parse the raw temperature data files and then upload the data to the partitioned data streams.

In some examples, a workflow of the system 300 includes the temperature engine 322 submitting compute node 324 tasks to export temperature entries daily. Data validation and model training is then performed based on the exported temperature entries (e.g., data validation performed by a data validator 106 and model training performed by a model training process 110). The trained model(s) are sent to the temperature engine 322, and the temperature engine 322 runs several compute node 324 tasks performing extent-level aggregation and storing of cold/hot candidate extents in data streams. The metadata server 320 fetches candidate extents and triggers EC format transitions as needed.

Figure 4:
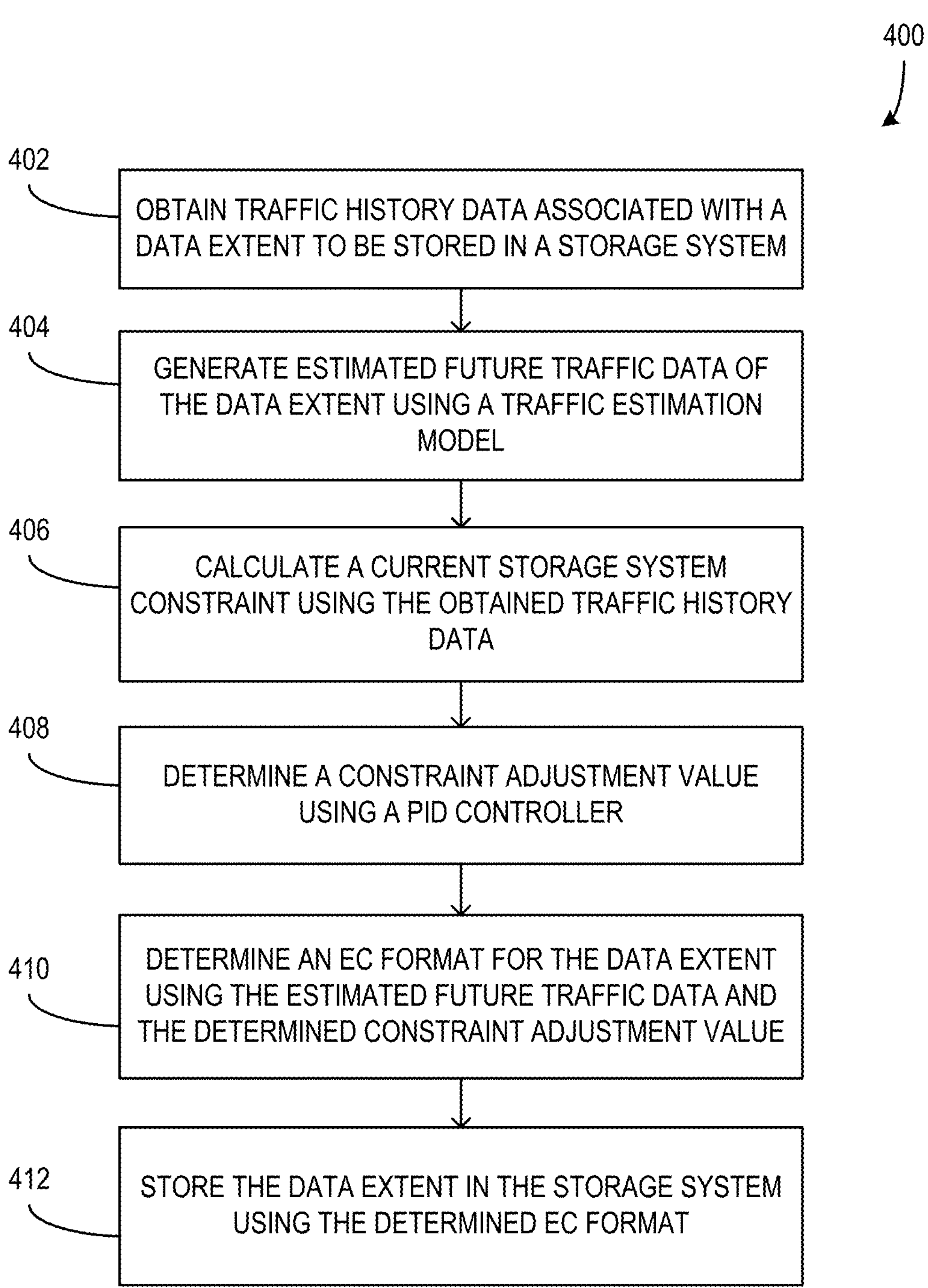
FIG. 4 is a flowchart illustrating an example method for determining an EC format for a data extent and for storing the data extent using the determined EC format.

FIG. 4 is a flowchart illustrating an exemplary method 400 for determining an EC format for a data extent and for storing the data extent using the determined EC format. In some examples, the method 400 is executed or otherwise performed in a system such as systems 100 and/or 200 of FIGS. 1 and/or 2.

At 402, traffic history data (e.g., history data 224) associated with a data extent is obtained, wherein the data extent is to be stored in a storage system. In some examples, the data extent is set to be stored in the storage system as a result of an event that has caused the current storage format of the data extent to be analyzed. Alternatively, or additionally, a list or group of stored data extents is periodically accessed, wherein the data extents of the list are stored using one of the hot EC format or the cold EC format and a subset of those data extents are identified for analysis, wherein the data extent for which the traffic history data has been obtained is part of that subset. Thus, in some examples, the method 400 is performed with respect to multiple data extents during the operations of the storage system. Additionally, in some examples, storing the data extent in the storage system using the determined EC format includes converting the data extent from a previous EC format to the determined EC format.

At 404, estimated future traffic (EFT) data (e.g., estimated future traffic 230) of the data extent is generated using a traffic estimation model, wherein the traffic estimation model is provided the obtained traffic history data as input. In some examples, the EFT data includes data indicating an estimated quantity of traffic that will be directed to the data extent over an immediate future time period. Further, in some examples, the traffic estimation model is a trained ML model.

Additionally, in some examples, the method 400 includes updating the training data of the traffic estimation model to include the obtained traffic history data and the determined EC format of the data extent (described below). Then, in the future, the traffic estimation model is updated or retrained using the updated training data using at least one ML technique. Thus, the accuracy and/or efficiency of the traffic estimation model is improved over time as the method 400 is performed in the associated system.

At 406, a current storage system constraint is calculated using the obtained traffic history data. Further, in some examples, the current storage system constraint is calculated based on a system state data set that includes data describing data that is currently stored in the storage system, such as quantities of data extents stored, quantity of data extents stored using the cold EC format, quantities of data extents stored using the hot EC format, or the like.

At 408, a constraint adjustment value is determined using a PID controller. In some examples, the constraint adjustment value includes data indicating a degree to which the storage of data extents using the cold EC format should be stored to cause the current storage system constraint to be adjusted toward a defined goal. For instance, in an example where the current storage system constraint is a ratio of an estimated cold extent traffic value (e.g., an estimate of the quantity of traffic directed to data extents stored using the cold EC format over time) to an estimated total extent traffic value (e.g., an estimate of the quantity of traffic directed to all data extents over time).

At 410, an EC format is determined for the data extent using the EFT data and the determined constraint adjustment value. In some examples, determining the EC format for the data extent includes determining the EFT data is within an uncertainty range, weighting the EFT data with a first weight factor, weighting the determined constraint adjustment value with a second weight factor based on determining that the EFT data is within the uncertainty range, combining the weighted EFT data and the weighted constraint adjustment value into a sum value, and determining the EC format for the data extent based on comparing the sum value to an extent temperature threshold.

At 412, the data extent is stored in the storage system using the determined EC format. In some examples, the determined EC format is either the hot EC format or the cold EC format.

In some examples, the method 400 further includes updating a system state data set using data associated with the stored data extent in the determined EC format, whereby future calculations of the current storage system constraint are based at least in part on storing the data extent in the determined EC format.

Figure 5:
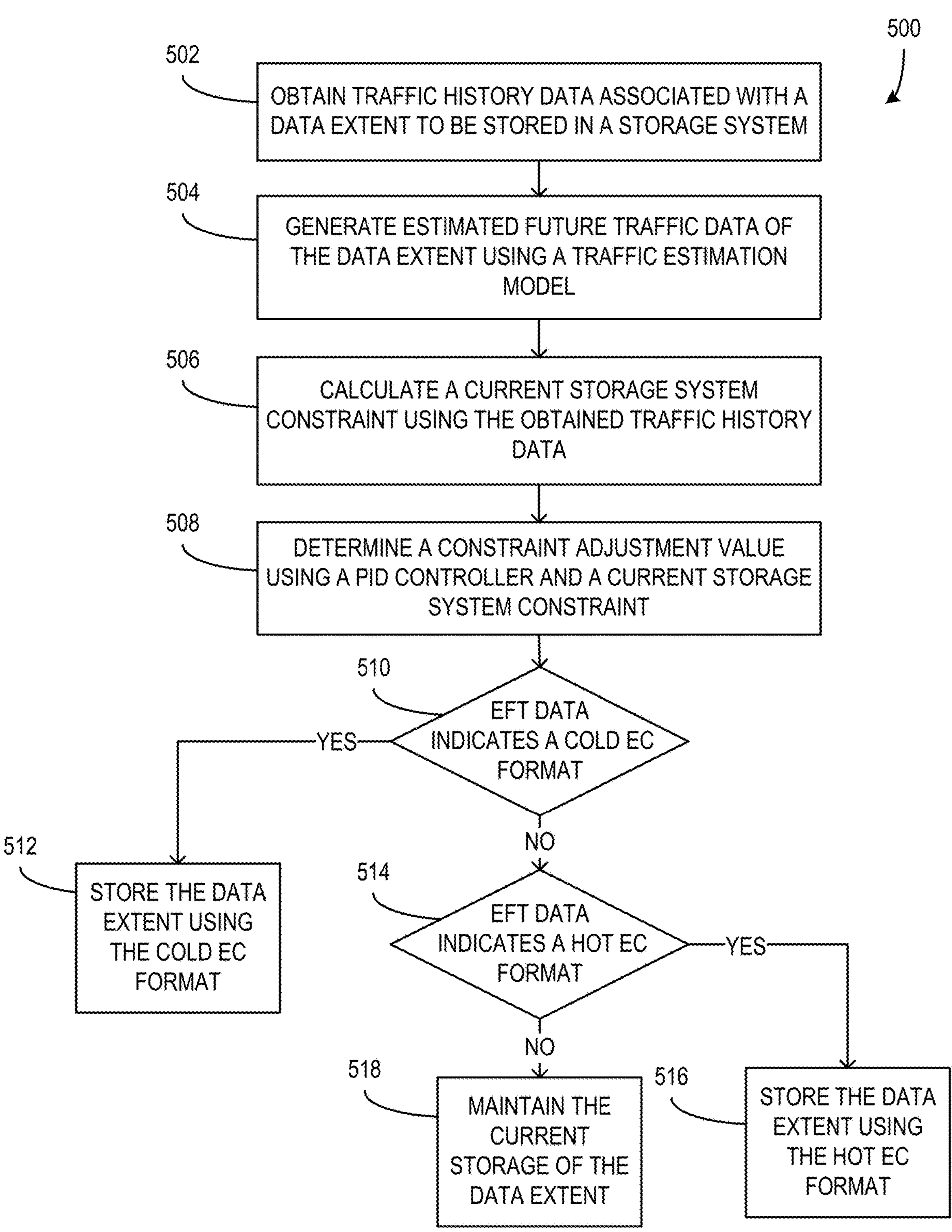
FIG. 5 is a flowchart illustrating an example method for determining an EC format for a data extent using estimated future traffic data and a filter using a constraint adjustment value.

FIG. 5 is a flowchart illustrating an exemplary method 500 for determining an EC format for a data extent using estimated future traffic data and a filter using a constraint adjustment value. In some examples, the method 500 is executed or otherwise performed in a system such as systems 100 and/or 200 of FIGS. 1 and/or 2.

At 502, traffic history data associated with a data extent to be stored in a storage system is obtained and, at 504, EFT data of the data extent is generated using a traffic estimation model. At 506, a current storage system constraint is calculated using the obtained traffic history data and, at 508, a constraint adjustment value is determined using a PID controller and the current storage system constraint. It should be understood that, in some examples, operations 502-508 of the method 500 are performed in substantially the same manner as 402-408 of the method 400 as described above.

At 510, if the EFT data indicates that the data extent should be stored using a cold EC format, the process proceeds to 512. Alternatively, if the EFT data does not indicate that the data extent should be stored using the cold EC format, the process proceeds to 514. In some examples, a cold EC threshold or range is compared to the EFT data, wherein the cold EC threshold or range indicates EFT data that results in a high certainty that the data extent should be stored using the cold EC format (e.g., a certainly cold data extent).

At 512, the data extent is stored using the cold EC format as described herein.

At 514, if the EFT data indicates that the data extent should be stored using a hot EC format, the process proceeds to 516. Alternatively, if the EFT data does not indicate that the data extent should be stored using the hot EC format, the process proceeds to 518. In some examples, a hot EC threshold or range is compared to the EFT data, wherein the hot EC threshold or range indicates EFT data that results in a high certainty that the data extent should be stored using the hot EC format (e.g., a certainly hot data extent).

At 516, the data extent is stored using the hot EC format as described herein.

At 518, the EFT data does not indicate that the data extent should be stored using either the cold EC format or the hot EC format. Thus, the state data extent is too uncertain, and the current storage of the data extent is maintained. If the data extent has not already been stored, it may default to be stored using the hot EC format to ensure that traffic directed to the new data extent can be efficiently handled. Alternatively, in other examples, other methods are used to determine a default EC format to use with the data extent without departing from the description Exemplary Operating Environment The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, determining EC formats for storing data extents in storage systems as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain traffic history data associated with a data extent to be stored in a storage system; generate estimated future traffic data of the data extent using a traffic estimation model, wherein the obtained traffic history data is provided to the traffic estimation model as input; calculate a current storage system constraint using the obtained traffic history data; determine a constraint adjustment value using a PID controller, wherein the calculated current storage system constraint is provided to the PID controller as input; determine an EC format for the data extent using the estimated future traffic data and the determined constraint adjustment value; and store the data extent in the storage system using the determined EC format.

An example computerized method comprises obtaining traffic history data associated with a data extent to be stored in a storage system; generating estimated future traffic data of the data extent using a traffic estimation model, wherein the obtained traffic history data is provided to the traffic estimation model as input; calculating a current storage system constraint using the obtained traffic history data; determining a constraint adjustment value using a feedback controller, wherein the calculated current storage system constraint is provided to the feedback controller as input; determining an EC format for the data extent using the estimated future traffic data and the determined constraint adjustment value; and storing the data extent in the storage system using the determined EC format.

One or more computer storage media have computer-executable instructions that, upon execution by a processor, cause the processor to at least: obtain traffic history data associated with a data extent to be stored in a storage system; generate estimated future traffic data of the data extent using a traffic estimation model, wherein the obtained traffic history data is provided to the traffic estimation model as input; calculate a current storage system constraint using the obtained traffic history data; determine a constraint adjustment value using a PID controller, wherein the calculated current storage system constraint is provided to the PID controller as input; determine an EC format for the data extent using the estimated future traffic data and the determined constraint adjustment value; and store the data extent in the storage system using the determined EC format.

Alternatively, or in addition to the other examples described herein, examples include any combination of the following:

- wherein the data extent was previously stored in the storage system using a previous EC format that is different than the determined EC format; and wherein storing the data extent in the storage system using the determined EC format includes converting the data extent from the previous EC format to the determined EC format.
- wherein determining the EC format for the data extent using the estimated future traffic data and the determined constraint adjustment value includes: determining that the estimated future traffic data is within an uncertainty range; weighting the estimated future traffic data with a first weight factor; weighting the determined constraint adjustment value with a second weight factor based on determining that the estimated future traffic data is within the uncertainty range; combining the weighted future traffic data and the weighted constraint adjustment value into a sum value; and determining the EC format for the data extent based on comparing the sum value to an extent temperature threshold.
- wherein calculating the current storage system constraint further uses a system state data set; and wherein the computerized method further comprises updating a system state data set using data associated with the stored data extent in the determined EC format, whereby future calculations of the current storage system constraint are based at least in part on storing the data extent in the determined EC format.
- further comprising: updating training data of a model trainer with the obtained traffic history data and the determined EC format of the data extent; and retraining traffic estimation model using the model trainer and the updated training data using a machine learning technique.
- wherein the current storage system constraint is a ratio of a cold extent traffic value to a total extent traffic value; and wherein the determined constraint adjustment value indicates a degree to which storage of data extents using a cold EC format should be stored to cause the ratio to be adjusted toward a defined ratio goal.
- further comprising: periodically accessing a list of stored data extents, wherein data extents on the list of stored data extents are stored using one of a hot EC format or a cold EC format; and identifying a subset of the data extents on the list of stored data extents for analysis, wherein the data extent is in the identified subset of data extents.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining traffic history data associated with a data extent to be stored in a storage system; exemplary means for generating estimated future traffic data of the data extent using a traffic estimation model, wherein the obtained traffic history data is provided to the traffic estimation model as input; exemplary means for calculating a current storage system constraint using the obtained traffic history data; exemplary means for determining a constraint adjustment value using a PID controller, wherein the calculated current storage system constraint is provided to the PID controller as input; exemplary means for determining an EC format for the data extent using the estimated future traffic data and the determined constraint adjustment value; and exemplary means for storing the data extent in the storage system using the determined EC format.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

obtain traffic history data associated with a data extent to be stored in a storage system;

generate estimated future traffic data of the data extent using a traffic estimation model, with the obtained traffic history data as input to the traffic estimation model;

calculate a current storage system constraint using the obtained traffic history data;

determine a constraint adjustment value using a proportional, integral, derivative (PID) controller, with the calculated current storage system constraint as input to the PID controller;

refine the constraint adjustment value using a filter that categorizes the data extent;

determine an erasure coding (EC) format for the data extent using the estimated future traffic data and the refined constraint adjustment value; and store the data extent in the storage system using the determined EC format.

2. The system of claim 1, wherein:

the data extent was previously stored in the storage system using a previous EC format, the previous EC format being different than the determined EC format; and storing the data extent in the storage system using the determined EC format comprises converting the data extent from the previous EC format to the determined EC format.

3. The system of claim 1, wherein determining the EC format for the data extent using the estimated future traffic data and the refined constraint adjustment value comprises:

determining that the estimated future traffic data is within an uncertainty range;

weighting the estimated future traffic data with a first weight factor;

weighting the refined constraint adjustment value with a second weight factor based on determining that the estimated future traffic data is within the uncertainty range;

combining the weighted estimated future traffic data and the weighted refined constraint adjustment value into a sum value; and based on comparing the sum value to an extent temperature threshold, determining the EC format for the data extent.

4. The system of claim 1, wherein calculating the current storage system constraint further comprises using a system state data set; and the memory and the computer program code are configured to further cause the processor to at least update the system state data set using the stored data extent in the determined EC format, whereby a future calculation of the current storage system constraint is based at least in part on storing the data extent in the determined EC format via the updated system state data set.

5. The system of claim 1, wherein the memory and the computer program code are configured to further cause the processor to:

update training data of a model trainer with the obtained traffic history data and the determined EC format of the data extent; and utilizing a machine learning technique, retrain the traffic estimation model using the model trainer and the updated training data.

6. The system of claim 1, wherein:

the current storage system constraint is a ratio of a cold extent traffic value to a total extent traffic value; and the determined constraint adjustment value indicates at least a degree to which the data extent should be stored using a cold EC format to adjust the ratio toward a defined ratio goal.

7. The system of claim 1, wherein the memory and the computer program code are configured to further cause the processor to:

periodically access a list of stored data extents, a second stored data extent on the list of stored data extents being stored using a hot EC format or a cold EC format; and identify a plurality of data extents on the list of stored data extents for analysis;

wherein the data extent is in the plurality of data extents.

8. A computerized method comprising:

obtaining traffic history data associated with a data extent to be stored in a storage system;

generating estimated future traffic data of the data extent using a traffic estimation model, with the obtained traffic history data as input to the traffic estimation model;

calculating a current storage system constraint using the obtained traffic history data;

determining a constraint adjustment value using a feedback controller, with the calculated current storage system constraint as input to the feedback controller;

refining the constraint adjustment value using a filter that categorizes the data extent;

determining an erasure coding (EC) format for the data extent using the estimated future traffic data and the refined constraint adjustment value; and storing the data extent in the storage system using the determined EC format.

9. The computerized method of claim 8, wherein:

the data extent was previously stored in the storage system using a previous EC format, the previous EC format being different than the determined EC format; and storing the data extent in the storage system using the determined EC format comprises converting the data extent from the previous EC format to the determined EC format.

10. The computerized method of claim 8, wherein determining the EC format for the data extent using the estimated future traffic data and the refined constraint adjustment value comprises:

determining that the estimated future traffic data is within an uncertainty range;

weighting the estimated future traffic data with a first weight factor;

weighting the refined constraint adjustment value with a second weight factor based on determining that the estimated future traffic data is within the uncertainty range;

combining the weighted estimated future traffic data and the weighted refined constraint adjustment value into a sum value; and based on comparing the sum value to an extent temperature threshold, determining the EC format for the data extent.

11. The computerized method of claim 8:

calculating the current storage system constraint further comprising using a system state data set; and the computerized method further comprises updating the system state data set using the stored data extent in the determined EC format, whereby a future calculation of the current storage system constraint is based at least in part on storing the data extent in the determined EC format via the updated system state data set.

12. The computerized method of claim 8, further comprising:

updating training data of a model trainer with the obtained traffic history data and the determined EC format of the data extent; and using a machine learning technique, retraining traffic estimation model using the model trainer and the updated training data.

13. The computerized method of claim 8, wherein:

the current storage system constraint is a ratio of a cold extent traffic value to a total extent traffic value; and the determined constraint adjustment value indicates at least a degree to which the data extent should be stored using a cold EC format to adjust the ratio toward a defined ratio goal.

14. The computerized method of claim 8, further comprising:

periodically accessing a list of stored data extents, a second stored data extent on the list of stored data extents being stored using a hot EC format or a cold EC format; and identifying a plurality of data extents on the list of stored data extents for analysis;

wherein the data extent is in the plurality of data extents.

15. A computer storage medium having computer-executable instructions that, upon execution by a processor, cause the processor to at least:

obtain traffic history data associated with a data extent to be stored in a storage system;

generate estimated future traffic data of the data extent using a traffic estimation model, with the obtained traffic history data as input to the traffic estimation model;

calculate a current storage system constraint using the obtained traffic history data;

determine a constraint adjustment value using a proportional, integral, derivative (PID) controller, with the calculated current storage system constraint as input to the PID controller;

refine the constraint adjustment value using a filter that categorizes the data extent;

determine an erasure coding (EC) format for the data extent using the estimated future traffic data and the refined constraint adjustment value; and store the data extent in the storage system using the determined EC format.

16. The computer storage medium of claim 15, wherein:

the data extent having been previously stored in the storage system using a previous EC format, the previous EC format being different than the determined EC format; and storing the data extent in the storage system using the determined EC format comprises converting the data extent from the previous EC format to the determined EC format.

17. The computer storage medium of claim 15, wherein determining the EC format for the data extent using the estimated future traffic data and the refined constraint adjustment value comprises:

determining that the estimated future traffic data is within an uncertainty range;

weighting the estimated future traffic data with a first weight factor;

weighting the refined constraint adjustment value with a second weight factor based on determining that the estimated future traffic data is within the uncertainty range;

combining the weighted estimated future traffic data and the weighted refined constraint adjustment value into a sum value; and based on comparing the sum value to an extent temperature threshold, determining the EC format for the data extent.

18. The computer storage medium of claim 15, wherein:

calculating the current storage system constraint further comprises using a system state data set; and the computer-executable instructions, upon execution by a processor, further cause the processor to at least update the system state data set using the stored data extent in the determined EC format, whereby a future calculation of the current storage system constraint is based at least in part on storing the data extent in the determined EC format via the updated system state data set.

19. The computer storage medium of claim 15, wherein:

refining the constraint adjustment value using the filter that categorizes the data extent comprises preventing an ineffective state transition of the EC format of the data extent, the ineffective state transition being dominated by global information from the PID controller rather than an individual extent characteristic of the data extent from the traffic history data and the estimated future traffic data.

20. The computer storage medium of claim 19, wherein preventing the ineffective state transition of the EC format of the data extent further comprises using at least the PID controller or the filter to:

categorize the data extent into a certainly cold type, a certainly hot type, or an uncertain type based on a predictive traffic ratio; and based on the categorizing, apply the PID controller primarily on the uncertain type of data extent.

* * * * *